US012684011B2

(12) United States Patent
Kumar et al.

(10) Patent No.: US 12,684,011 B2
(45) Date of Patent: Jul. 14, 2026

(54) PROTECTING BACKUP SYSTEMS AGAINST SECURITY THREATS USING ARTIFICIAL INTELLEGENCE

(71) Applicant: Dell Products L.P., Round Rock, TX (US)

(72) Inventors: Avinash Kumar, Patna (IN); Mahesh Reddy Av, Bangalore (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 18/352,985

(22) Filed: Jul. 14, 2023

(65) Prior Publication Data

US 2025/0023909 A1      Jan. 16, 2025

(51) Int. Cl.
*H04L 9/40*          (2022.01)

(52) U.S. Cl.
CPC ........ *H04L 63/145* (2013.01); *H04L 63/1466* (2013.01)

(58) Field of Classification Search
CPC ..................... H04L 63/1454; H04L 63/1466
See application file for complete search history.

(56) References Cited

U.S. PATENT DOCUMENTS

| | | | | |
|---|---|---|---|---|
| 10,387,896 B1 * | 8/2019 | Hershey | ................ | H04N 23/90 |
| 2015/0052606 A1 * | 2/2015 | Romero Bueno | .. | H04L 63/1425 |
| | | | | 726/23 |
| 2017/0177627 A1 * | 6/2017 | Singh | .................... | G06F 16/353 |
| 2018/0032900 A1 * | 2/2018 | Chowdhury | ........... | G06N 20/10 |
| 2019/0260804 A1 * | 8/2019 | Beck | ................... | H04L 63/1416 |
| 2020/0012886 A1 * | 1/2020 | Walters | ................... | G06T 7/194 |
| 2020/0358792 A1 * | 11/2020 | Bazalgette | ............. | G06N 20/00 |
| 2022/0046031 A1 * | 2/2022 | Kaidi | ................... | H04L 63/1433 |
| 2022/0327207 A1 * | 10/2022 | Turbin | ................. | G06F 21/568 |
| 2022/0405185 A1 * | 12/2022 | Joshi | ....................... | G06F 9/542 |
| 2023/0325503 A1 * | 10/2023 | Orevi | ..................... | G06F 21/568 |
| | | | | 726/23 |
| 2023/0409715 A1 * | 12/2023 | Nissim | ................ | G06F 9/45533 |

* cited by examiner

*Primary Examiner* — William S Powers
(74) *Attorney, Agent, or Firm* — Staniford Tomita LLP

(57)          ABSTRACT
A data protection system uses machine learning to detect the cyber-attacks on a data protection system in advance to notify the user of possible attacks and also instigate any counter attacks to the best possible extent. The system trains a support vector machine model (SVM) to recognize a malware, or other type of attack before it comes into action against the system. This model learns the parameters of hazardous files or code to prepare the best model of attributes of such files to help block the malware proactively. It uses several independent variables as features to gain more accuracy to the threat detection. Some of the parameters include: rate of data change (Drastic/High/Low), attack vulnerability history, resource usage history, performance metrics, application hit ratio, and the like.

19 Claims, 5 Drawing Sheets

100

400

500

PROTECTING BACKUP SYSTEMS AGAINST SECURITY THREATS USING ARTIFICIAL INTELLEGENCE

TECHNICAL FIELD

Embodiments are generally directed to data protection systems, and more specifically to detecting and preventing cyber-attack threats to backup servers using artificial intelligence.

BACKGROUND

Data protection systems back up data from backup clients to storage media through a backup server executing data backup programs. Such data can then be restored to the original data sources after any system or data problem is resolved. Maintaining the security and integrity of backup data from corruption and theft is of paramount importance for most organizations today.

Up to billions of dollars are currently spent to overcome post threat impacts to data security. Such measures only address attacks once they have happened and after data has been lost or compromised. Although remedial solutions are available, such solutions remedy a problem once at least some damage has been done, and comes with the cost of recovering any data that might have been lost.

What is needed, therefore, is a data protection solution that proactively protects data servers without impacting the production data and that proactively identifies threats to alert the user or initiate appropriate self-protection measures.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments include a data protection system that implements an SVM-based classifier and uses machine learning to detect cyber-attacks or other security threats to a data protection system in advance to notify the user of possible attacks and also instigate any counter attacks to the best possible extent.

A data protection process trains a support vector machine model (SVM) to recognize a malware, or other type of attack before it comes into action against the system. This model learns the parameters of hazardous files or code to prepare the best model of attributes of such files to help block the malware proactively. The process uses several independent variables as features to gain more accuracy to the threat detection. Some of the parameters include: rate of data change (Drastic/High/Low), attack vulnerability history, resource usage history, performance metrics, application hit ratio, and so on.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
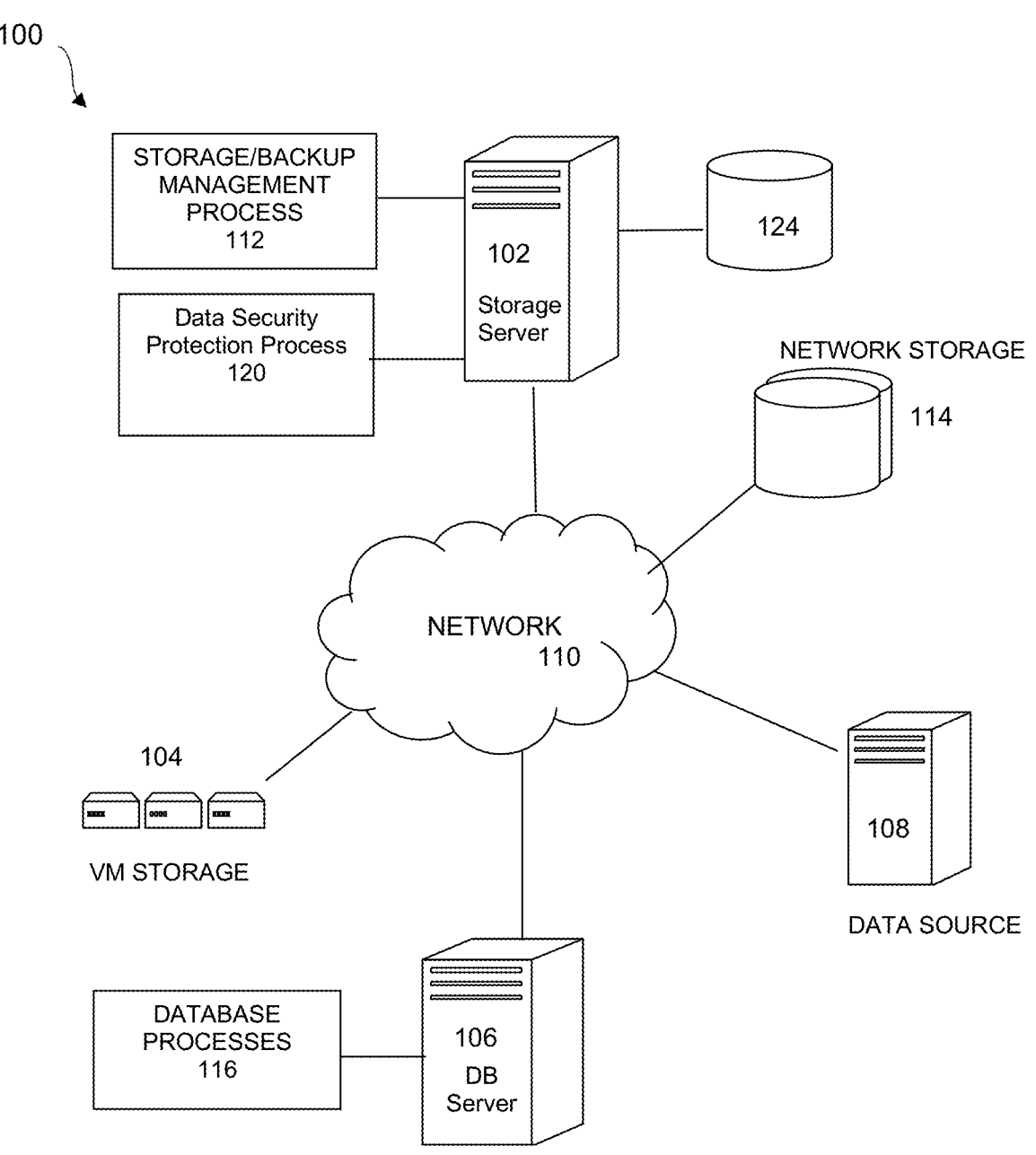
FIG. 1 illustrates a computer network system that implements one or more embodiments of a backup system implementing an intelligent shield against security threats.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Some embodiments involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

With ever increasing amounts of data to be backed up on a regular basis and increasing protection requirements for such data assets, data security is at the forefront of most organizations' concerns. Embodiments are directed to a system and method that utilizes certain artificial intelligence methods to detect and classify network attacks, and instigate measures to warn users and initiate self-protection measures.

FIG. 1 illustrates a computer network system that implements one or more embodiments of a backup system implementing a data protection process that guards against security attacks 120. In system 100, a storage server 102 executes a data storage or backup management process 112 that coordinates or manages the backup of data from one or more data sources 108 to storage devices, such as network storage 114, client storage, and/or virtual storage devices 104.

With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Disaster recovery and data restore applications typically involve a data backup system for backing up database data. One example is a Dell PowerProtect data management system that is a software defined data protection system including automated discovery, data deduplication, self-service and IT governance for physical, virtual and cloud environments.

As stated above, the data assets within the system may be subject to constant threat by bad actors wishing to steal, corrupt, or otherwise render useless data within the system. Embodiments include an intelligent process 120 to protect data protection systems from security threats that utilizes certain artificial intelligence (AI) and machine learning (ML) mechanisms to guard against cyber-attacks and malicious action. Such threats may include external attacks, such as malware, hacking, data theft, sabotage, and other malicious attacks by third party actors, and similar acts. Various different types of data or cybersecurity attacks can be used to target computer systems, including denial-of-service (DOS) attacks, man-in-the-middle (MITM) attacks, phishing attacks, password attacks, ransomware attacks in which the attacker threatens to publish, destroy, or permanently block access to the data unless a ransom is paid, and so on.

Embodiments of process 120 include a mechanism to proactively identify data security threats and alert the user or automatically initiate actions to rectify the threats to the data protection software and server. Such a solution uses machine learning to detect the attacks in advance and not only notify the user of possible attacks, but also formulate counter attacks to the greatest extent possible.

In an embodiment, the process trains a Support Vector Machine model (SVM) to recognize a malware, or other type of attack before it comes into action against the system. This model learns the parameters of hazardous files or program code to prepare the best model of attributes of such files to help block the malware proactively. The process uses several independent variables as features to gain more accuracy to the threat detection. Some of these variables include: rate of data change (drastic/high/low), attack vulnerability history, resource usage history, performance metrics, application hit ratio, and so on.

The data server is integrated with the data protection solution to be constantly trained with historical data and patterns from the end user, lab environments and user inputs to continuously improve the accuracy of the model. The SVM classifier used in this solution not only identifies any threat proactively, but also mitigates the threats posed by the attack. The data protection system can be integrated with this intelligence feature to produce a relatively threat-free environment with maximum accuracy.

Figure 2:
FIG. 2 is a block diagram of an intelligent shield against security threats, under some embodiments.
Figure 2:
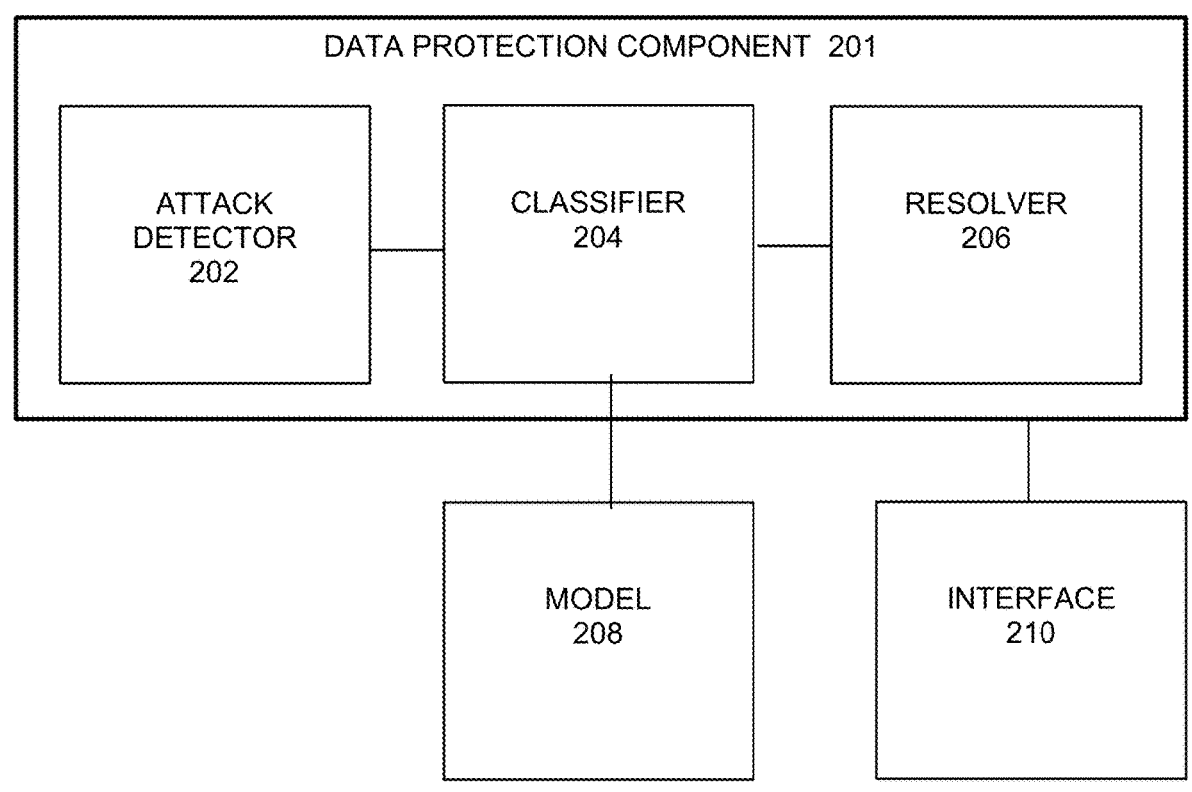

FIG. 2 is a block diagram of a component for detecting and preventing threats to a data protection system, under some embodiments. For the embodiment of FIG. 2, data protection 201 comprises a detector module 202 that detects or receives indication of internal or external attacks to data assets of the backup system, a classifier 204 that classifies the detected attack using a classifier 204, such as an SVM classifier that is trained using model 208. Once the attack is classified, a resolver component 206 warns the user through interface 210 and/or takes the appropriate measures to automatically initiate remedial measures against the attack.

In an embodiment, the classifier uses the SVM algorithm. SVM is a supervised machine learning algorithm that can be used for classification and regression analysis and is particularly well-suited to deal with complex datasets with non-linear boundaries. It works by finding the best threshold (hyperplane) that separates the data into distinct classes, and involves identifying the optimal hyperplane that divides the data into different categories. Maximizing the margin between classes is the goal of SVM, which can improve the algorithm's generalization performance. SVM can perform both linear and nonlinear classification tasks.

In the context of a data protection product, SVM can be used to identify potential security threats to the data and the system. For example, SVM can be used to detect anomalous network traffic patterns, which can indicate a potential network attack. SVM can also be used to identify suspicious user behavior, such as unauthorized access attempts or unusual file access patterns. SVM can be an effective tool for intelligent coverage of security threats, as it can detect complex patterns in large datasets and adapt to changing threat landscapes. In this embodiment, the SVM algorithm maximizes the margin between the negative hyperplane (non-threat) and the positive hyperplane (threat) after acting upon the features as the support vectors.

In an embodiment, analyzed data comprises program code, such as for an executable program or script, upon execution, may create a problem. It may also comprise a data element or data item that is recently input for processing by the system In the context of threat detection for a data protection product, the analyzed data thus encompasses two distinct components: program code and data elements recently input for processing. The program code itself, such as executable code or scripts, have the potential to create issues when executed. This includes software programs, executable files, or scripts designed to perform specific actions or operations. Likewise, data items that have been recently provided as inputs for processing by the system can originate from users or external sources, such as files or network packets. These data elements may not be program code themselves, but they can still pose a threat if they contain malicious content or exploit vulnerabilities within the system. Therefore, the analyzed data comprises both program code and data elements, and these two components can play different roles in the context of threat detection and mitigation in a data protection product.

In an embodiment, the detector 202 utilizes a DBSCAN, or any similar scanning tool, to identify the outliers or the noise (threats). As an example, DBSCAN (Density-Based Spatial Clustering of Applications with Noise) is a density-based clustering algorithm widely used in machine learning and data mining. It is particularly useful for discovering clusters of arbitrary shapes in datasets with varying densities. It assigns each instance in the dataset to a cluster or labels them as noise points (outliers) based on their density and proximity to other instances. This helps identify potential clusters of threats present in the data.

By combining DBSCAN with an SVM model, the clustering capabilities of DBSCAN help identify the threats proactively, which are then used to extract relevant features and train the SVM model. This integrated approach enhances the ability to detect and classify cyber threats effectively. Although DBSCAN is described, embodiments are not so limited, and other similar scanning methods may also be used.

For such an embodiment, certain system parameters and characteristics can be monitored to indicate any detected an out-of-tolerance behavior of a component of the server, such as excessive CPU or memory usage, excessive network traffic, initiation of defensive mechanisms (e.g., firewalls, anti-virus triggers, etc.), and so on. These represent only a few of the thousands of unique issues documented from historical data and the local lab environment over an extended period of time, which were used to train the machine learning model to achieve the highest accuracy possible. Any number of additional or other error conditions can also be used depending on system configuration, applications, and so on. The error notification may be implemented as an GUI provided error message (text or visual warning), indication in a user or system log of an error or anomalous condition, device generated warning, or other similar notification. Thresholds that define the tolerance level and/or the base measure against which outliers or noise is defined can be set to default values for each relevant parameter or characteristic. They may also be configurable through user definition or system admin or policy definition.

The system is configured to detect various types of malware attacks that are indicated by behavior in excess of a defined threshold. These include, viruses: malicious software that can replicate itself and infect other files and programs on a system; trojan horses: program code disguised as legitimate software designed to trick users into installing them, and that then perform malicious actions, such as stealing data or providing remote access to an attacker; worms: self-replicating malware that can spread quickly through a network, causing damage to systems and data; ransomware: malware that encrypts a victim's data and demands a ransom payment in exchange for the decryption key; adware: software that displays unwanted ads or pop-ups on a user's device; and spyware: software that secretly collects information about a user's activities, such as keystrokes, browsing history, and login credentials. This is only a representative list for example purposes, and other attack types can also be detected depending on system configuration and applications. For example, the component can also be used to detect MITM (Man-in-the-Middle) attacks, where an attacker intercepts communication between two parties and can eavesdrop or alter the communication. Other examples of malware may target specific organization hooks or features, such as "Company System Detect," "Company SupportAssist," and "Company RecoverPoint" vulnerabilities, for example.

Figure 3:
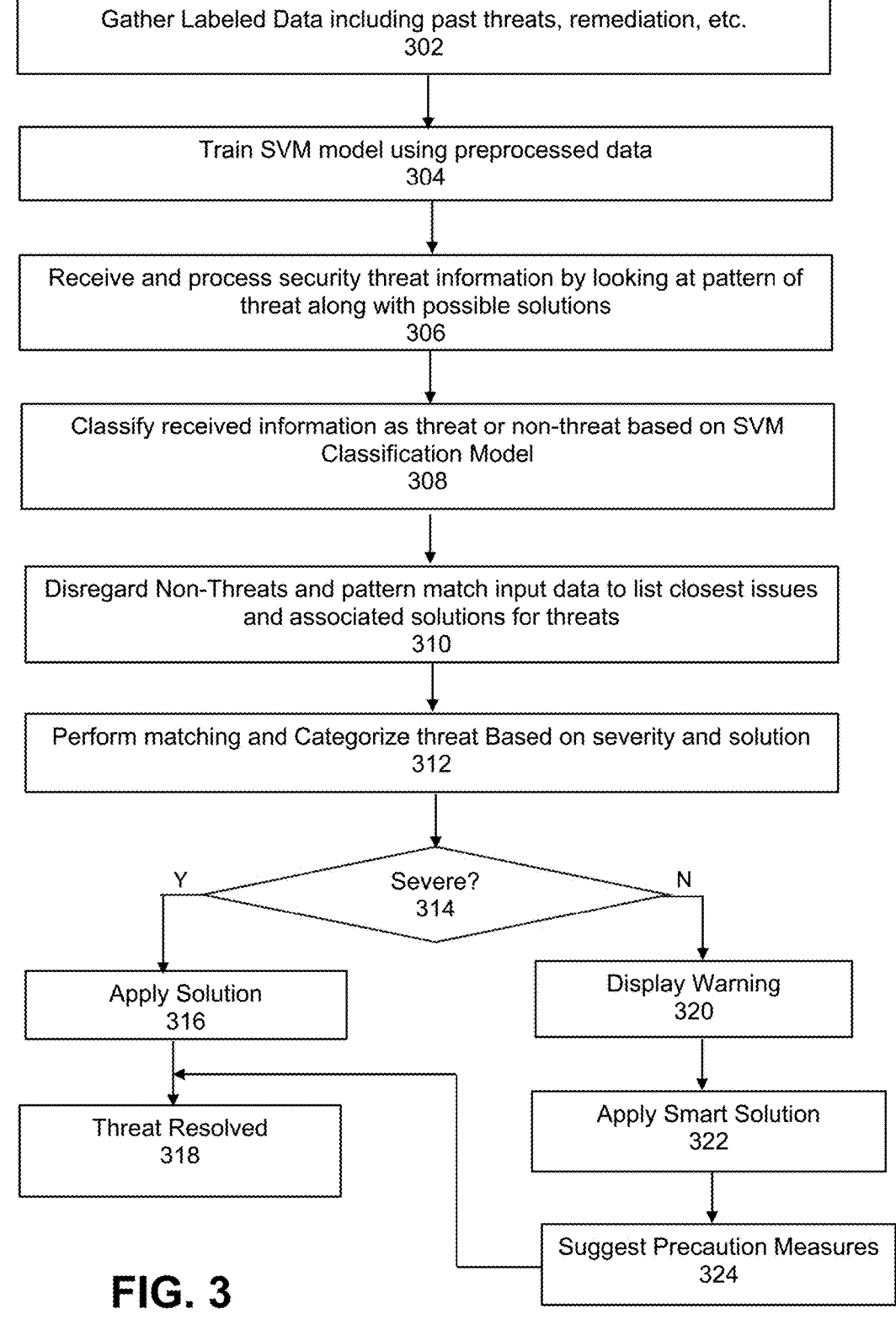
FIG. 3 is a flowchart illustrating intelligently securing a data protection system against security threats, under some embodiments.

FIG. 3 is a flowchart for a method of intelligently securing a data protection system against security threats, under some embodiments, and specifically illustrates protecting data using SVM-based machine learning mechanisms. To utilize the algorithm, the process 120 uses a labeled dataset is required as input. Each instance or observation within the dataset is labeled with its corresponding category or class.

As shown in FIG. 3, process 300 begins with gathering labeled data, 302, which includes data related to past security threats, their impact, and the associated remediation steps. While the features or attributes that describe each instance may be either continuous or discrete, they are typically converted to discrete values before being used with the algorithm.

In an embodiment, the data is labeled with threat labels and healing labels, among other possible labels. For threat labels, each data instance or sample is assigned a threat label indicating the specific type of security threat it represents. For example, the labels could include "0" for non-threat instances and "1" for instances representing a security threat. Alternatively, multiple threat classes can be assigned labels such as "2" for malware, "3" for intrusion attempts, "4" for data breaches, and so on. Similarly, data instances can be labeled with healing or remedial action labels to specify the appropriate response when a particular threat is detected. The healing labels could be encoded as numeric values, where each value represents a specific action or solution. For instance, "0" could indicate no action required, "1" could indicate isolating the affected system, "2" could represent initiating a system scan, and so on.

The labeling process is typically done to assign appropriate numeric labels based on the predefined threat and healing categories. These labels serve as the ground truth for training the SVM model, allowing it to learn the patterns and relationships between input data and the corresponding threat and healing actions. During the training phase, the SVM model learns to classify new, unlabeled data instances by identifying the decision boundary that separates different threat classes. It uses the labeled data to optimize this boundary and make accurate predictions on unseen data. By labeling the data with threat and healing action codes, the SVM model can effectively detect and respond to security threats within a data protection product.

The data can be collected from various sources, such as internal modules, threat intelligence feeds, security logs, and so on. This step can be done using the DBSCAN or other similar scan process, as described above. Once the data is collected, it is preprocessed to convert it into a feature set that can be used by the SVM algorithm. The next step 304 is to train the SVM model using the preprocessed data. The SVM model learns from the labeled data and creates a decision boundary that separates the security threats from the non-threats. This decision boundary is optimized to provide the highest classification accuracy. In an embodiment, this is a binary threshold in which a data item is classified as either a threat or non-threat.

In an embodiment, the model 208 as trained in step 304 is trained with a large amount historical security data generated by the customers across a substantial period of time (e.g., on the order of several decades). Various different attributes, as cited above are used to train the model. In general, the model can be trained using text and data mining (TDM) or machine-reading processes that involve analyzing and extracting information from vast quantities of data used as training material. In an embodiment, any appropriate body of data can be used as historical data. For example, large-scale enterprises may rely on a large, long established customer base (e.g., up to 100,000s of customers over decades) to generate historical data that can provide insights into data growth, integrity, risk vulnerability, coverage, self-protection capabilities, and similar information. This can then be used to train the ML model. In addition to this actual user data, theoretical use or simulations performed in lab conditions can also be used. In some cases industry standard datasets may also be used if appropriate in particular use cases to train the model. The historical data set may be comprised of numerical data, categorical data, time-series data, and text data, providing a comprehensive and varied range of data for training the model.

Data mining processes such as TDM use automated computational techniques to analyze large amounts of information to identify patterns, trends and other useful information. The collected data can also be conditioned by processes that clean the text data to remove inconsistent, unreliable or redundant data, and to normalize the data into a specific format adapted to the relevant application. For example. Such normalization can involve reducing its randomness to conform to predefined standards and improve efficiency. Other similar data collection and conditioning processes may also be used to produce a suitable model 208.

In an embodiment, the process 300 receives and processes the collected data item by analyzing a pattern of threat embodied in the data, 306. Thus, once the SVM model is trained, it can be used to classify new data as either a security threat or a non-threat, 308. The SVM algorithm takes in the features of the new data item and calculates its distance from the decision boundary. Based on this distance, the SVM algorithm assigns the new data to one of the two classes, i.e., threat or non-threat.

In process 300, a data item classified as a non-threat is disregarded, and the system processes the next data item for classification, 310. If an input data item has been analyzed and classified as a threat, process 300 matches the data item against the model to identify the list of threats and associated solutions, 310.

With respect to the pattern matching process, the input data item is analyzed and categorized as a threat, using the SVM machine learning model to identify the list of threats and their respective associated solutions. This process starts with classification, where the SVM model is employed to classify the input data item as a threat. By leveraging the patterns and decision boundaries learned during training, the SVM model determines the appropriate threat category. Next, threats are mapped to solutions: Once the threat classification is obtained, the model maps it to the corresponding set of solutions. These associations are established during the training phase of the SVM model and are used to link threats with their appropriate remedial actions. The process then identifies associated solutions. Through the mapping process, the SVM model retrieves the associated solutions that are aligned with the identified threat category. These solutions are selected based on the patterns and correlations learned by the model during training. By executing these steps, the SVM machine learning model facilitates the identification of threats and their corresponding solutions when analyzing an input data item. This framework enables efficient threat mitigation and resolution based on the capabilities of the SVM model.

In an embodiment, various issues constituting actual or potential threats can be listed together along with known or potential solutions in a database. Alternatively, issues can be listed along with procedures to rectify the issues that may comprise combinations of steps, and which can be implemented as scripts or executable routines/sub-routines.

For this embodiment, the various issues constituting actual or potential threats can be listed in a database along with known or potential solutions. This leads to a correlation between the identified threats and the corresponding solutions, and by this linkage, the system aims to address and mitigate the potential risks effectively. Furthermore, the solutions can be implemented in the form of scripts or executables. This implies that the solutions are actionable and can be executed programmatically to rectify the identified issues. The use of scripts or executables allows for automated implementation, making the process more efficient and scalable.

In the context of using SVM machine learning model, it is likely that the threats and solutions are classified or predicted using this model. SVM can be trained to classify the threats and provide corresponding solutions based on patterns and features extracted from the data. By leveraging the capabilities of SVM, the system can accurately map threats to their appropriate solutions, providing a reliable and efficient mechanism to address security issues.

In step 312, the process categorizes the pattern matched threat based on a severity measure and the required actions for remediation. Threats can be categorized as High/Medium/Low severity, Severe/Not_Severe, and similar severity rankings based on the type of threat. The categorization can also take into account the possible remedy or solution. In an embodiment, there are three categories of threat issues that are classified. The first category is self-healable issues, where the SVM model detects a threat and takes automated steps to fix the issue. These steps are predefined in the training dataset and include actions such as taking a backup of data, removing the problematic code (e.g. virus or ransomware), and applying known steps, KBAs (Knowledge-based articles), or documentation to resolve the issue. For example, if the SVM model detects ransomware in the customer environment, it will take a copy of the data, remove the ransomware, and apply the existing steps from the training data to fix the issue.

The second category is manual fixing by the user. In this case, the SVM model detects a threat but cannot automatically remediate the issue. Instead, the model provides recommendations and guidance to the user on how to fix the issue manually. For example, if the SVM model detects a malware attack that requires specific user action to fix, it will provide instructions to the user on how to perform the required steps to remediate the issue.

The third category is escalation to the solution provider or vendor. In this case, the SVM model detects a threat that cannot be fixed by the customer or the SVM model. The customer is then advised to escalate the issue to the solution provider or vendor, who can provide further assistance in resolving the issue. For example, if the SVM model detects a product defect in a vendor product that is causing a security threat, the customer is advised to contact the vendor for further support.

Various different responses can be instigated based on the severity classification and possible solution, such as simply issuing a warning, automatically initiating a best solution, shutting down the system to prevent theft or permanent data loss, escalating to vendor customer service, and so on. For the embodiment of FIG. 3, process 300 determines whether or not the threat is severe, and if so automatically applies a matched solution 316 to resolve the threat 318. In some cases, the automatic execution of remedial solutions may be disruptive to the system or even entail its own possible issues, such as suspending backup/restore operations, forcing data copying, restricting user access, and so on. If the threat is not severe, as determined in step 314, the system may be configured to display a warning to the user to prompt appropriate user-initiated responses, 320. A smart solution 322 may also be initiated, which is generally a response that minimizes impact to the system, but still resolves the threat. Alternatively, or in addition, the system may be configured to provide suggestions of solutions to be undertaken by the system, 324 in order to resolve the threat, 318.

Process 300 illustrates an overall method in which an SVM model is used to detect and fix a wide range of security threats, including malware attacks and MITM attacks. The severity and required actions for remediation are classified into a number (e.g., three) of categories, with the SVM model providing automated, manual, or escalation-based solutions depending on the nature of the threat. FIG. 3 illustrates one example process for detecting, categorizing, and addressing a threat, and embodiments are not so limited. Depending on system configuration and applications, threats classified into different threat levels besides the binary threat/non_threat classifications, pattern matching can be based on any trained model data, and the severity of a classified threat can be categorized into any appropriate severity level with any practical solution associated with each matched threat.

For the embodiments of FIGS. 2 and 3, the classifier comprises an SVM classifier using SVM algorithm attempts to create the best line or decision boundary that can segregate n-dimensional space into classes so that a new data point ca be put in the correct category in the future. This best decision boundary is called a hyperplane, and SVM chooses the extreme points/vectors that help in creating the hyper-plane, where these extreme cases are called as support vectors.

Besides the SVM algorithm, the classifier may use other AI-based classification methods. One such method is the KNN-based classification algorithm. The KNN (K-Nearest Neighbors) algorithm is a non-parametric, lazy learning method that classifies data based on the similarity of features between neighboring instances. The algorithm calculates the distance between the new instance and its K nearest neigh-bors in the training set to determine the class label. KNN is simple to implement and works well when there is a lot of training data, but it can be computationally expensive and slow for large datasets.

With respect to the KNN, process, KNN basically stands for k-nearest neighbors (KNN) algorithm, and is a classifi-cation algorithm that can be well used in case of classifica-tion and regression scenarios. KNN is a supervised learning algorithm that is dependent upon the labelled input data to study a function that would produce an output when a new unlabeled data is given as input. It classifies the data point on how its neighbor is classified. The basic principle of this model is to classify any new input data based on the similarity measure of the data points which was stored earlier. As used herein, "supervised learning" refers to a subcategory of machine learning (ML) and artificial intelli-gence (AI) that is defined by the use of labeled datasets to train algorithms that to classify data or predict outcomes accurately.

For example, consider a dataset of fruits comprising coconuts and grapes. The KNN model will get trained with similar measures like shape, color, weight, etc. When some random fruit is processed, KNN will try to match its similarity with the color (red or yellow), weight and shape. A similar process can be used with the properties of data object that are used to tailor the KNN model to fit the data protection embodiment. Any new error message processed by the system can be classified into a known error type certain defined attributes or patterns. In this process, 'K' in KNN signifies the number of the nearest neighbors that would be leveraged to classify new data points (e.g., new Virtual Machines/Docker/any data object).

Figure 4:
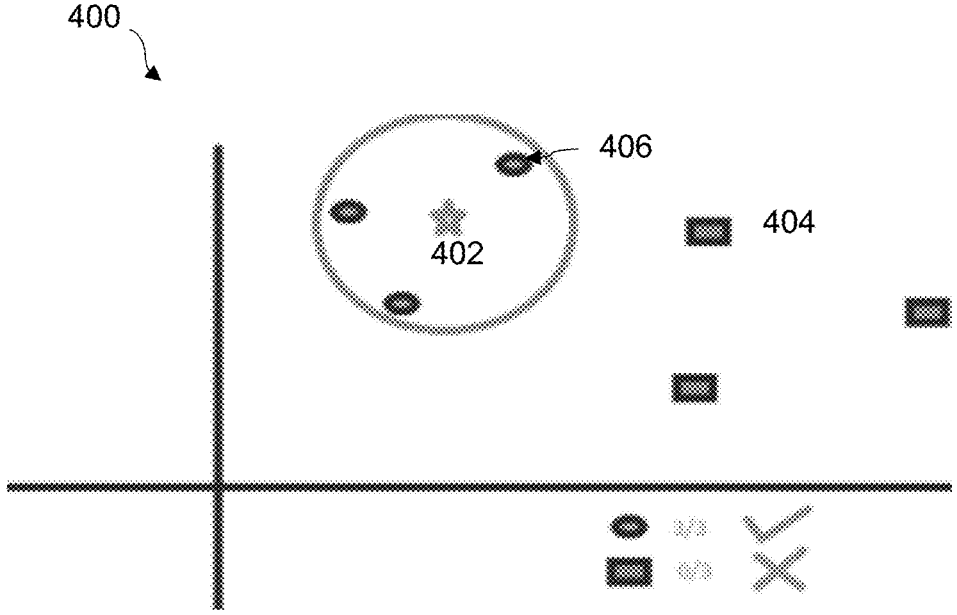
FIG. 4 illustrates a simple example depiction of a KNN implementation that can be used for a data protection component, under some embodiments.

FIG. 4 illustrates a simple example depiction of a KNN implementation that can be used for a data protection component, under some embodiments. Plot 400 of FIG. 4 shows that if a new input (star 402) is to be classified into a circle 406 or rectangle 404, then the KNN model would calculate the Euclidian distance between the "Star-Circle" and "Star-Rectangle" for three occurrences (K=3). Since the three circles 406 are closest to the new data 402, this star 402 would be classified as circle 406.

Figure 5:
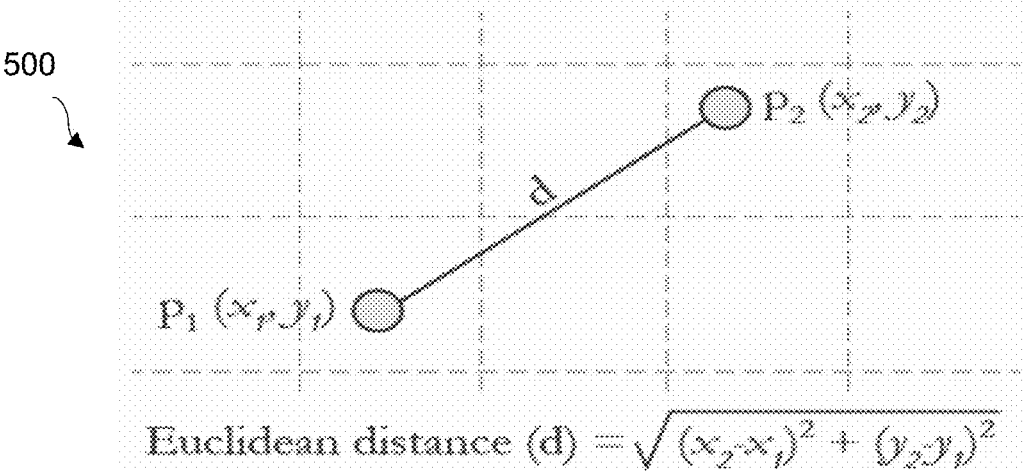
FIG. 5 illustrates a plot representation for the calculation of Euclidean distance for a KNN implementation, under some embodiments.

FIG. 5 illustrates a plot representation 500 for the calcu-lation of Euclidean distance for a KNN implementation, under some embodiments. As shown in FIG. 5, the Euclid-ean distance (d) between points $P_1$ ($x_1$, $y_1$) and $P_2$ ($x_2$, $y_2$) is calculated by the following formula:

$$d = SQRT\left((x_2 - x_1)^2 + (y_2 - y_1)^2\right)$$

For an embodiment in which the KNN-based method is used, some relevant parameters that can be used to train the KNN model include:

Data Collection: Similar to SVM, KNN requires a labeled dataset for training the model. You need to collect data related to security threats and their corresponding labels (e.g., malware, ransomware, etc.) for training the KNN model can include feature selection, model training, perfor-mance evaluation, and deployment, among others.

For feature selection, electing relevant features for the KNN model is important to achieve better accuracy. Fea-tures such as file size, file type, access time, and user activity can be considered. For model training, once the data and features are selected, the KNN model can be trained using the labeled dataset. For performance evaluation, after the model is trained, its performance needs to be evaluated using a test dataset. The accuracy of the model can be measured by comparing the predicted labels with the actual labels in the test dataset. For deployment, once the KNN model is trained and its accuracy is evaluated, it can be deployed for security threat detection and protection/remediation. If a security threat is detected, the KNN model can recommend a course of action to fix the issue, such as removing the malicious file or patching the system.

The above list is provided for example only, and embodi-ments are not so limited. Other or different characteristics regarding system performance can be used. In general, the choice of these above parameters for either KNN or SVM will depend on the specific requirements and constraints of the use case. It is generally important to select features that are relevant to the problem and provide a good representa-tion of the system threats. The performance of the KNN and SVM models can be evaluated using metrics such as accu-racy, precision, recall, and F1 score.

These metrics (accuracy, precision, recall, and F1) are commonly used evaluation metrics for machine learning models like Support Vector Machines (SVM) and k-Nearest Neighbors (KNN). Accuracy represents the overall correct-ness of predictions, calculated as the ratio of correct pre-dictions to the total predictions. Higher accuracy indicates better performance. Precision measures the proportion of correctly predicted positive instances out of all instances predicted as positive. It is the ratio of true positives to the sum of true positives and false positives, where higher precision means fewer false positives. Recall (or sensitivity or true positive rate) quantifies the proportion of correctly predicted positive instances out of all actual positive instances. It is the ratio of true positives to the sum of true positives and false negatives. Higher recall means fewer false negatives. The F1 score combines precision and recall into a single metric, providing a balanced evaluation of a model's performance. It is calculated as the harmonic mean of precision and recall, and a higher value indicates a better trade-off between the two metrics. These metrics all help assess the effectiveness of SVM and KNN models in clas-sification tasks, allowing us to evaluate their accuracy, precision, recall, and overall prediction capabilities.

As shown in FIG. 2, the model for the classifier 204 is trained using historical data, and laboratory data if appro-priate. This training generally involves analyzing historical data for the defined attributes and deriving priorities from that data. In an embodiment, the data protection component 201 utilizes certain artificial intelligence (AI) and machine learning (ML) processes to evaluate different error notifica-tions for resolution. Such a process generally uses a training component that continuously trains a machine learning algorithm.

Figure 6:
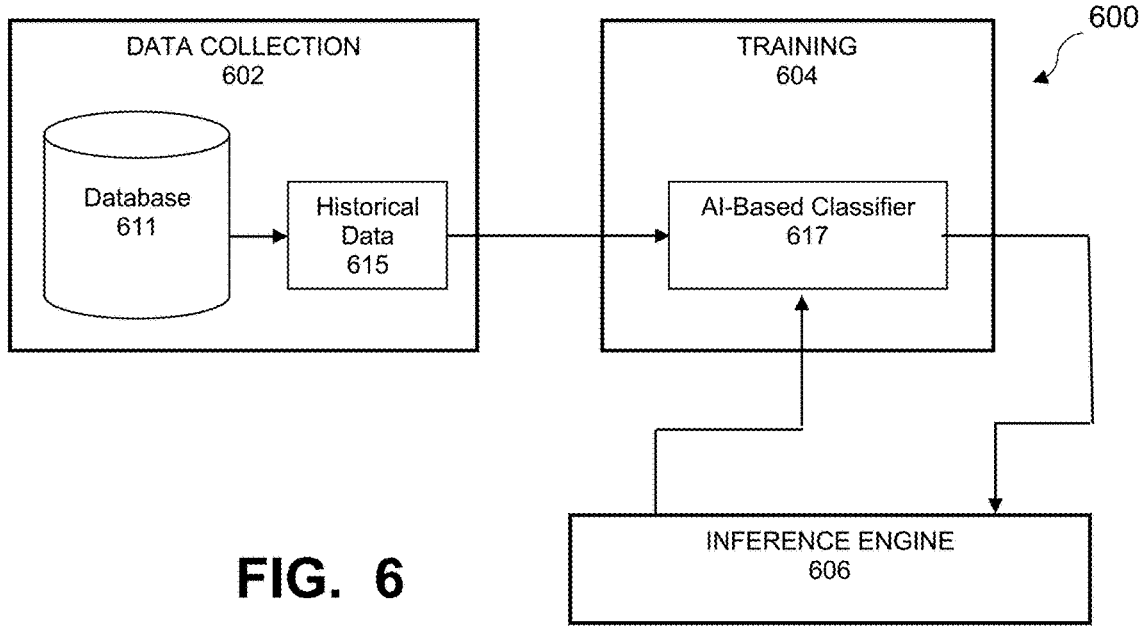
FIG. 6 illustrates a general AI/ML component used in a threat prevention and data protection component, under some embodiments.

FIG. 6 illustrates a general AI/ML component used in a threat prevention and data protection component, under some embodiments. System 600 of FIG. 6 includes a data collection component 602, a training component 604, and an inference component 606. The data collection component 602 can comprise various data loggers and I/O capture devices and databases 611 along with a body of historical information 615 about past events (e.g., data usage, attacks, compromises, etc.). The data collection component 602 continuously monitors and collects event data to build up its database. This collected information is submitted to the training component 604 through an AI-based analyzer 617. This component continuously trains a machine learning algorithm to identify the event attributes to thereby determine an issue associated with an error message or notification. The inference engine 606 also continuously trains the AI/ML algorithms through monitored events.

Figure 7:
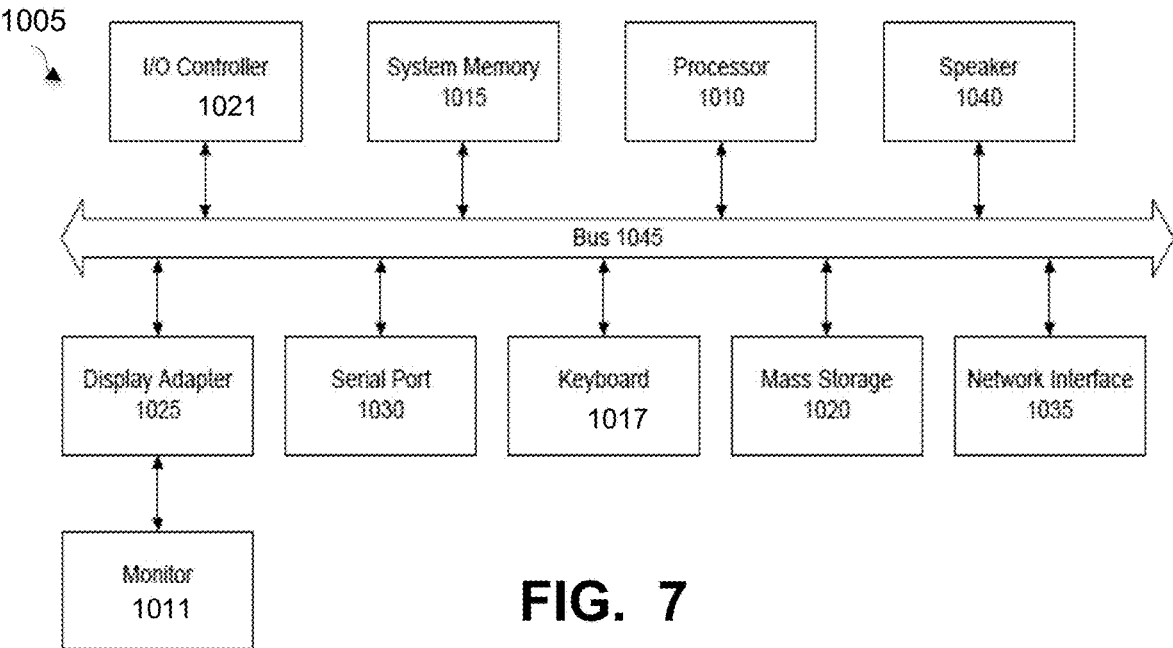
FIG. 7 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network or data protection system may comprise a computing device capable of executing software code to perform the processing steps described herein. FIG. 7 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of protecting against threats to data assets in a data protection network, comprising:

first labeling the data assets with threat labels indicating a specific type of security threat a corresponding data asset represents to first assign labels based on predefined threat categories;

second labeling the data assets with healing labels specifying a response when a particular threat to a data asset is detected to second assign labels based on predefined healing categories, wherein the healing labels comprise numeric values dictating a response comprising one of taking no action, isolating the affected system, or initiating a system scan;

using the first and second assigned labels to allow a support vector machine (SVM) to learn patterns between input data and corresponding threat and healing actions;

training the SVM to classify new data instances by identifying a decision boundary separating different threat classes, wherein the SVM classifies new, unlabeled data by identifying a decision boundary separating different threat classes and labeled data using the first and second assigned labels to optimize the decision boundary and make accurate predictions on new data;

optimizing the decision boundary using the labeled data assets and predict threats from unseen data;

processing a data element of the data assets affecting an operation of the data protection network;

performing a scan of the data element using density-based clustering to identify outliers as noise points to identify potential clusters of threats;

extracting relevant features from the density-based clustering to train a model;

analyzing the data element in relation to the model, wherein the model is used to train an artificial intelligence (AI) based classifier that utilizes the SVM to implement an SVM classifier as a supervised machine learning that defines a hyperplane separating the data element into the threat or non-threat classification as distinct classes;

classifying the operation as a threat or non-threat based on the model;

categorizing the classified operation with respect to a severity and associated solution; and performing, for a threat classified operation, at least one of transmitting a warning message and automatically initiating the associated solution in response to the threat.

2. The method of claim 1 wherein the data element comprises one of an input data string or an executable program code, and wherein the operation is a threat comprising a data attack, and wherein the scan comprising monitoring the data protection network for out-of-tolerance behavior including excessive CPU or memory usage, excessive network traffic, and initiation of defensive mechanisms.

3. The method of claim 2 wherein the data attack comprises at least one of: a virus, a trojan horse, a worm, ransomware, adware, spyware, a man-in-the-middle (MITM) attack, or organization-specific vulnerability attacks, and further wherein the threat labels comprise '0' for non-threats, '1' for threats, '2' for malware, '3' for intrusion attempts, '4' for data breaches, and wherein the healing labels comprise '0' for no action required, '1' for isolating the system, and '2' for initiating a system scan.

4. The method of claim 1 wherein the model is trained using a training dataset comprising at least one of historical data of past threats and solutions that address each respective threat, or theoretical and simulated data using laboratory conditions.

5. The method of claim 4 wherein the SVM classifier uses a plurality of independent variables to classify the operation, and comprising at least one of: rate of data change, attack vulnerability history, resource usage history, performance metrics, and application hit ratio.

6. The method of claim 4 wherein the severity comprises a severe level causing the network to take a backup of data, remove data element and automatically initiate executables of the associated solution.

7. The method of claim 6 wherein the severity comprises a medium level causing the system to notify a user of the threat, provide recommendations, and prompt the user to perform a manual or user-initiated operation of the associated solution.

8. The method of claim 7 wherein the severity comprises a high level causing the system to escalate the issue to notification of a system vendor for outside assistance to initiate the associated solution.

9. The method of claim 4 wherein the AI-based classifier comprises a k-nearest neighbors (KNN) process that processes the data element by comparing it with K-nearest instances in the training dataset.

10. The method of claim 9 further comprising training a model for the KNN process using at least one of data collection, feature selection, model training, performance evaluation, and deployment.

11. The method of claim 1 wherein the network comprises a PowerProtect Data Domain deduplication backup system.

12. A system for protecting against threats to data assets in a data protection network, comprising:

a system component first labeling the data assets with threat labels indicating a specific type of security threat a corresponding data asset represents to first assign labels based on predefined threat categories, second labeling the data assets with healing labels specifying a response when a particular threat to a data asset is detected to second assign labels based on predefined healing categories, wherein the healing labels comprise numeric values dictating a response comprising one of taking no action, isolating the affected system, or initiating a system scan, using the first and second assigned labels to allow a support vector machine (SVM) to learn patterns between input data and corresponding threat and healing actions, training the SVM to classify new data instances by identifying a decision boundary separating different threat classes, and optimizing the decision boundary using the labeled data assets and predict threats from unseen data;

a hardware-based data protection component processing a data element of the data assets affecting an operation of the data protection network;

a scanning tool performing a scan of the data element using density-based clustering to identify outliers as noise points to identify potential clusters of threats and extracting relevant features from the density-based clustering to train a model, wherein the scan comprising monitoring the data protection network for out-of-tolerance behavior including excessive CPU or memory usage, excessive network traffic, and initiation of defensive mechanisms;

a processor-based classifier classifying the operation as a threat or non-threat based on the model after analysis of the data element in relation to the model used to train an artificial intelligence (AI) based classifier that utilizes the SVM to implement an SVM classifier as a supervised machine learning that defines a hyperplane separating the data element into the threat or non-threat classification as distinct classes; and a component categorizing the classified operation with respect to a severity and associated solution, and performing, for a threat classified operation, at least one of transmitting a warning message and automatically initiating the associated solution in response to the threat.

13. The system of claim 12 wherein the data element comprises one of an input data string or an executable program code, and wherein the operation is a threat comprising a data attack, and further wherein the data attack comprises at least one of: a virus, a trojan horse, a worm, ransomware, adware, spyware, a man-in-the-middle (MITM) attack, or organization-specific vulnerability attacks.

14. The system of claim 13 wherein the model is trained using a training dataset comprising at least one of historical data of past threats and solutions that address each respective threat, or theoretical and simulated data using laboratory conditions.

15. The system of claim 14 wherein the SVM classifier uses a plurality of independent variables to classify the operation, and comprising at least one of: rate of data change, attack vulnerability history, resource usage history, performance metrics, and application hit ratio.

16. The system of claim 15 wherein the severity comprises one of:

a severe level causing the network to take a backup of data, remove data element and automatically initiate executables of the associated solution;

a medium level causing the system to notify a user of the threat, provide recommendations, and prompt the user to perform a manual or user-initiated operation of the associated solution; and a high level causing the system to escalate the issue to notification of a system vendor for outside assistance to initiate the associated solution.

17. The system of claim 14 wherein the AI-based classifier comprises a k-nearest neighbors (KNN) process that processes the data element by comparing it with K-nearest instances in the training dataset.

18. The system of claim 17 further comprising training a model for the KNN process using at least one of data collection, feature selection, model training, performance evaluation, and deployment.

19. A tangible computer program product having stored thereon program instructions that, when executed by a process, cause the processor to perform a method of protecting against threats to data assets in a data protection network, comprising:

first labeling the data assets with threat labels indicating a specific type of security threat a corresponding data asset represents to first assign labels based on predefined threat categories;

second labeling the data assets with healing labels specifying a response when a particular threat to a data asset is detected to second assign labels based on predefined healing categories, wherein the healing labels comprise numeric values dictating a response comprising one of taking no action, isolating the affected system, or initiating a system scan;

using the first and second assigned labels to allow a support vector machine (SVM) to learn patterns between input data and corresponding threat and healing actions;

training the SVM to classify new data instances by identifying a decision boundary separating different threat classes, wherein the SVM classifies new, unlabeled data by identifying a decision boundary separating different threat classes and labeled data using the first and second assigned labels to optimize the decision boundary and make accurate predictions on new data;

optimizing the decision boundary using the labeled data assets and predicting threats from unseen data;

processing a data element of the data assets affecting an operation of the data protection network;

performing a scan of the data element using density-based clustering to identify outliers as noise points to identify potential clusters of threats, wherein the scan comprising monitoring the data protection network for out-of-tolerance behavior including excessive CPU or memory usage, excessive network traffic, and initiation of defensive mechanisms;

extracting relevant features from the density-based clustering to train a model;

analyzing the data element in relation to the model, wherein the model is used to train an artificial intelligence (AI) based classifier that utilizes the SVM to implement an SVM classifier as a supervised machine learning that defines a hyperplane separating the data element into the threat or non-threat classification as distinct classes;

classifying the operation as a threat or non-threat based on the model;

categorizing the classified operation with respect to a severity and associated solution; and performing, for a threat classified operation, at least one of transmitting a warning message and automatically initiating the associated solution in response to the threat, wherein the data element comprises one of an input data string or an executable program code, and wherein the operation is a threat comprising a data attack, and further wherein the data attack comprises at least one of: a virus, a trojan horse, a worm, ransomware, adware, spyware, a man-in-the-middle (MITM) attack, or organization-specific vulnerability attacks.

* * * * *